June 17, 1924.
R. H. LYON ET AL
MOTOR VEHICLE LIGHT
Filed May 11, 1921
1,497,760
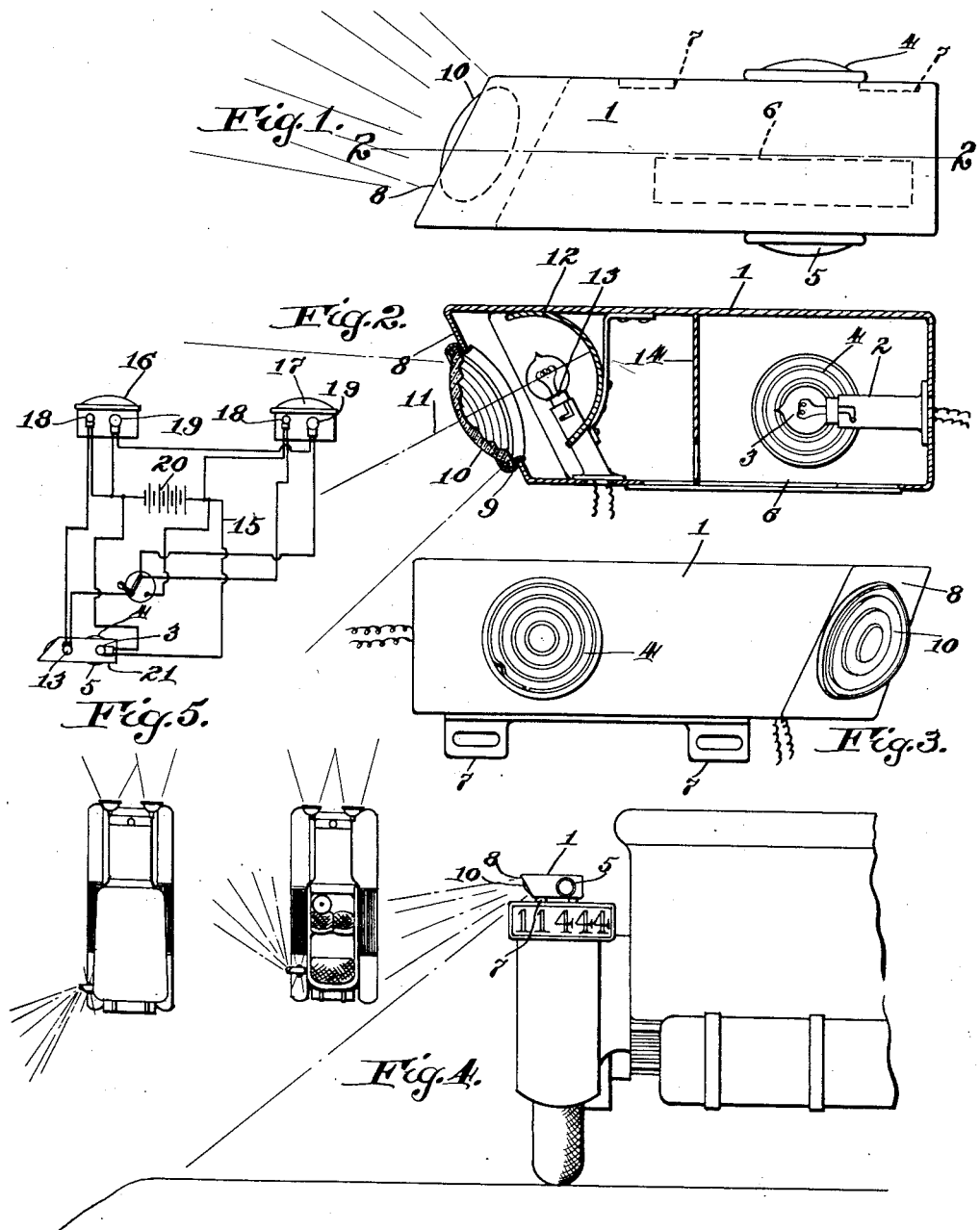

Patented June 17, 1924.

1,497,760

UNITED STATES PATENT OFFICE.

ROBERT H. LYON AND HENRY C. KIRK, OF BALTIMORE, MARYLAND.

MOTOR-VEHICLE LIGHT.

Application filed May 11, 1921. Serial No. 468,529.

*To all whom it may concern:*

Be it known that we, ROBERT H. LYON and HENRY C. KIRK, citizens of the United States of America, residing in the city of Baltimore, State of Maryland, have invented certain new and useful Improvements in Motor-Vehicle Lights, of which the following is a specification.

The dangers of night driving attributed to the blinding of drivers by the glare of approaching head lights are well known.

The present invention embodies in connection with a parking and tail light a device by means of which accidents from this cause may to a large degree be prevented, if not entirely eliminated and relates to these features separately and to the combination thereof for the purposes aforesaid and for compactness and added efficiency as herein set forth.

The applicants have proceeded on the theory that the majority of these accidents are due as much to lack of effective illumination at the side of the road as to the glare of the headlights themselves. The illumination of the road by the ordinary head lights is more or less ineffective on behalf of the driver of the vehicle carrying the lights because the amount of light refracted from the road surface back to the driver's eyes, i. e., the light by which he can see the road ahead, is comparatively small, the majority of the rays which strike the road being sent forward. The lights of passing vehicles as they approach overcome this comparatively dim effect, blinding the driver as to the course of his own machine. The majority of accidents occur because the drivers either seek to pass by too wide a margin, sending their machines into the ditch which is concealed by lack of illumination or, being uncertain on this account, as to the location of the ditch, they attempt to clear it by too wide a margin so that the machines in passing come in contact.

The present invention provides illumination for the side of the road whereby the drivers of passing vehicles are enabled to observe the exact width of roadway available to them, thus avoiding a chance of collision by close passing, as well as accidents by ditching. The illumination thus provided also serves to reveal to the drivers of passing vehicles any pedestrian who may be on or near the side of the road in the vicinity of the point of passing where the danger to the pedestrian is at the maximum both on account of the blinding of the drivers by the headlight glare and on account of the extra width of road occupied by the passing vehicles. To this end the applicants' invention contemplates a lantern or light having or including means for projecting an illuminating ray from the side of the vehicle near the rear forward, downward and to the side, usually the left, causing the light to strike the road at an angle at which a large portion of the rays will be reflected from the road surface and turned forwardly toward the approaching vehicle revealing to the driver the location and extent of the clear passage-way. The rays may, if desired, be turned backward and to the side instead of forward.

The applicants' light or lantern also comprises a tail and parking light preferably illuminated from a separate source. The side light to be effective is necessarily of considerable brilliancy and is illuminated by means of a bulb which may be of fifteen, twenty-five or more candle power, while the illumination for the parking and tail light requiring less brilliancy is preferably provided by means of a small bulb which may be from two to eight or any convenient candle power. For purposes of economy and for convenience of arrangement separate bulbs for the side and tail lights are desirable.

In the preferred form the lantern structure consists of an elongated casing which is adapted to be placed with its length transversely of the car and on usually the left side preferably near the rear. This light may be placed on the crown or high point of the rear fender usually being set up about two inches. The position being that occupied by the parking light and directly over the number plate, in fact, the casing may to advantage be provided with slotted or perforated ears to which the number plate may be attached and the floor of the box or casing may be slotted to project the light downward and illuminate the number plate.

The end of the casing which is turned toward the passing side, usually the left side of the machine, is provided with a lens turned forward, downward and to the left or right according to which is the passing side. There should also be a reflector in alignment with the lens, the bulb being between the lens and reflector. The lens and reflector may be turned to the rear instead of forward.

In order that the lantern may serve the function of a tail light and parking light we have provided the casing at this end with a white lens set in the front wall and a red lens set substantially opposite in the rear wall, the bottom wall or floor being slotted as aforesaid to project the light on the number plate.

In the accompanying drawing we have illustrated a combined side light, parking light, tail light and lantern bracket constructed in accordance with and embodying our invention in the preferred form.

In the drawings:

Fig. 1 is a plan of the lantern or light.

Fig. 2 is a vertical central section on the line 2—2, of Fig. 1.

Fig. 3 is a front view, i. e. a view taken from the side of the light which faces the front of the machine when it is mounted thereon in accordance with the intent of the invention.

Fig. 4 is a fragmentary rear elevation of an automobile having a lantern or light in accordance with my invention mounted thereon.

Fig. 5 is a diagrammatic view showing a possible electric circuit for and in connection with our side, parking and tail light.

Referring to the drawings by numerals, the light or lantern as shown consists of an elongated casing 1 which is provided at one side with a socket 2 for a small tail or parking light blub 3 and with a white lens 4 in the front wall of the box in alignment with the small bulb 3 and a red lens 5 in the rear wall of the box in alignment with the white lens 4 and with the bulb 3.

The box or casing 1 is also provided with a slot 6 in the bottom wall of the box in the vicinity of the tail and parking bulb 3 to permit the light from this bulb to be projected upon the number plate which may be supported by means of lugs 7, 7 depending from the bottom wall of the casing just forward of the slot 6. The end wall 8 of the box as shown is inclined forward and downward and has mounted therein in a suitable aperture 9 a white lens 10, the axis or focus line 11 of which extends in relation to the machine carrying the light forward, downward and to the passing side, usually the left in the normal position of the light on the machine. In cooperative relation with this lens 10 having its axis in alignment with the axis 11 we have shown a reflector 12 and at or near the focus of the reflector and lens or more particularly in the line of the axis of both and between them we have shown a bulb 13 which is preferably of considerably larger capacity than the tail light bulb. This may be and preferably is of eighteen or twenty candle power or thereabouts.

For convenience of illustration we have shown the box as divided longitudinally into two parts by a transverse partition 14 but this feature is not considered essential to the invention. We have also shown in Fig. 5 circuit diagram 15 including headlights 16, 17 having dimming bulbs 18, 18 and bright bulbs 19, 19. The circuit is supplied with current by battery 20. The diagram also includes a light or lantern 21 in accordance with our invention having a side light bulb 13 and tail and parking light bulb 3. The diagram illustrates particularly that the side light 13 may be arranged in connection with the dimmers so that when the dimmers are on the bright lights being out the side light is in circuit and illuminated. This is the preferred arrangement though not essential to the invention.

When two machines are passing one or both being provided with the equipment herein described, the machine or machines thus equipped will provide extra illumination at the side whereby the passageway at the side of the machine carrying the said equipment is flooded with light which is thrown forward and downward in such a way that a considerable portion of the rays striking the road are reflected in the direction of the driver of the approaching machine revealing the portion of the roadway which he must use in passing much more clearly than by means of the most brilliant headlights, it being understood that the majority of the rays from the head lights are reflected forwardly after contact with the road so that they do not reach the eyes of the driver of the machine carrying the lights and therefore afford him no assistance in seeing the road.

The important feature of the present invention is that the rays of light are thrown on the part of the road which safety of both machines requires that the driver of the approaching vehicle should see and these rays are so directed upon the road that they are reflected into the eyes of the driver of the approaching machine giving him a clear view of this portion of the road.

As already pointed out the illuminating ray may also be turned backward, downward and to the side.

We have thus described specifically and in detail a single embodiment of our invention in order that the nature and operation of the same may be clearly understood. However the specific terms herein are used descriptively rather than in a limiting sense, the scope of the invention being defined in the claims,

What we claim and desire to secure by Letters Patent is:

1. In combination a tail and parking light having a source of illumination a white lens in front and a red lens in the rear of the same and a side light having a separate source of illumination with means for projecting the light therefrom forward downward and to the passing side.

2. A tail and parking light comprising a source of illumination a white lens at the front of the same, a red lens at the rear, a slot for passing light to the number plate, a second source of illumination, a lens on one side of the same and a reflector on the opposite side arranged to project the light downward and to the left.

3. An automobile light comprising an elongated casing adapted to be supported on the machine near the rear with the long dimension extending transversely, the said lantern having a red lens in the rear, white lens in the front, a slot beneath, means for supporting a number plate at the bottom of the lantern, a reflector and a lens at the end of the casing the same being arranged in alignment and having their axes extending forward, downward and to the left of the machine.

4. An automobile light comprising an elongated casing adapted to be supported on the machine at the rear and with the long dimension extending transversely, one end of said casing being arranged to form a tail light provided with a source of illumination and having a red lens at the rear, a white lens in the front, a slot at the bottom, a bulb near the opposite end of the casing, a reflector on one side of said bulb, a lens on the other side, the lens, bulb and reflector being in alignment, the axis of said lens and reflector being directed downward, forward and to the side of the machine.

5. A light for automobiles having means for attaching the same to the vehicle a lens, a reflector, and a source of illumination, the lens and reflector having their axes substantially in alignment which axes are turned downward and to the passing side of the vehicle and a second source of illumination in said light with a transparent colored member in the rear of said second source of illumination.

Signed by us at Baltimore, Maryland, this 9th day of May, 1921.

ROBERT H. LYON.
HENRY C. KIRK.

Witnesses:
PORTER H. FLAUTT,
FREDERICA HOFFMANN.